Feb. 25, 1930.  T. J. BELL ET AL  1,748,826
REGISTERING AND CHECKING APPARATUS
Filed May 2, 1928   3 Sheets-Sheet 1

INVENTORS
THOMAS J. BELL AND
JOHN W. BELL,
BY
ATTORNEY.

Feb. 25, 1930.  T. J. BELL ET AL  1,748,826
REGISTERING AND CHECKING APPARATUS
Filed May 2, 1928   3 Sheets-Sheet 2
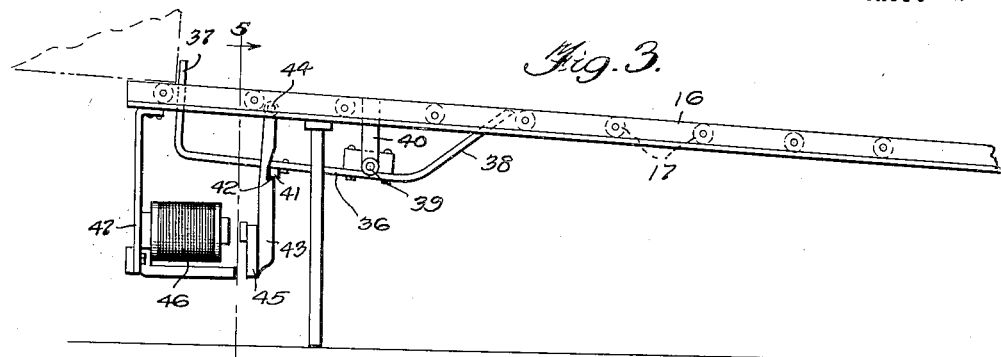
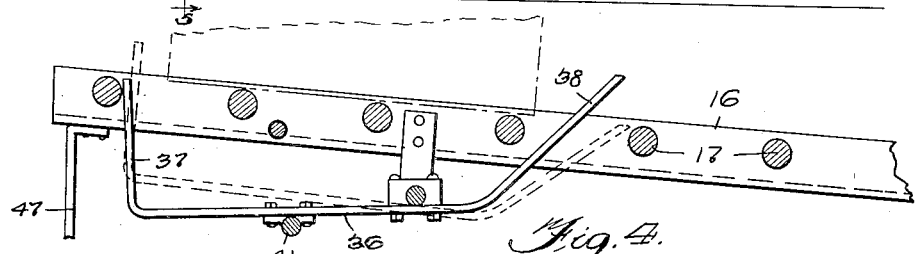
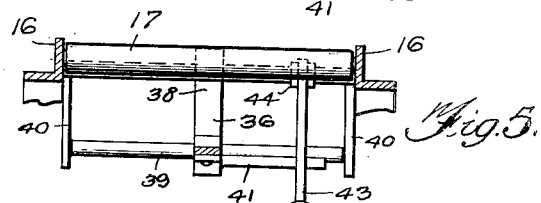
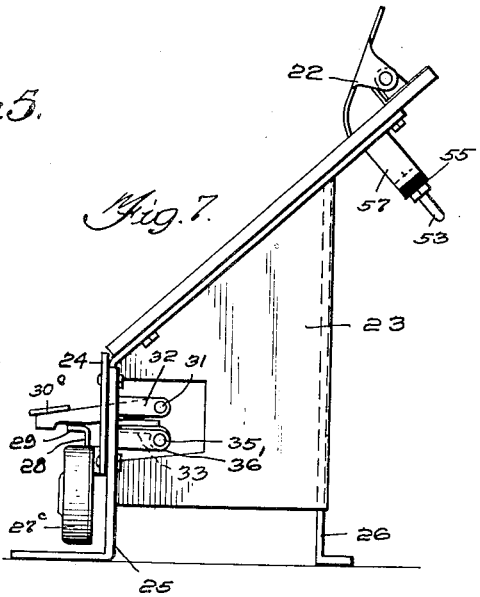
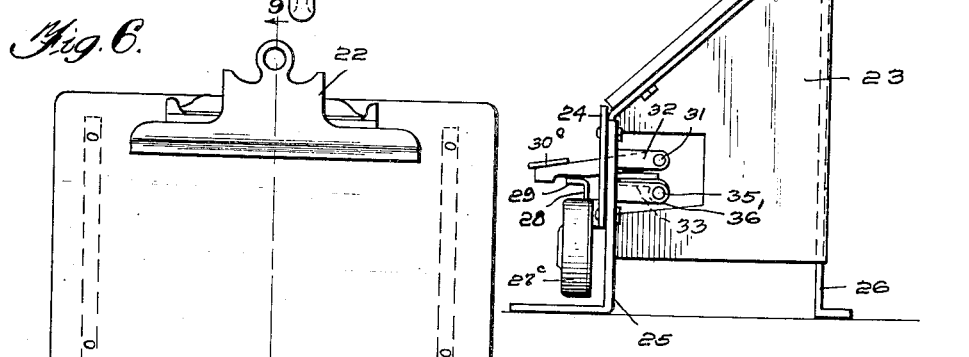
INVENTORS
THOMAS J. BELL
JOHN W. BELL,
BY
ATTORNEY.

Feb. 25, 1930. T. J. BELL ET AL 1,748,826
REGISTERING AND CHECKING APPARATUS
Filed May 2, 1928 3 Sheets-Sheet 3

INVENTORS
THOMAS J. BELL AND
JOHN W. BELL,
BY
ATTORNEY.

Patented Feb. 25, 1930

1,748,826

UNITED STATES PATENT OFFICE

THOMAS J. BELL AND JOHN W. BELL, OF LAKE MONROE, FLORIDA

REGISTERING AND CHECKING APPARATUS

Application filed May 2, 1928. Serial No. 274,584.

The present invention relates to apparatus for registering crates, boxes or packages of merchandise, during the handling or shipment of the same.

In accordance with our invention, we provide a plurality of distributing conveyors, leading to desired points, such as, to different cars. These distributing conveyors are preferably inclined roller conveyors. A feeding conveyor preferably runs transversely of the take up ends of the distributing conveyors, for delivering crates or the like to the same. Each distributing conveyor is provided with a stop element, normally arranged in the path of travel of the crate or the like, to be discharged upon such distributing conveyor. A plurality of tally boards or combined registering and releasing devices are employed, and are preferably arranged in the shipping room. These tally boards correspond in number and arrangement to the distributing conveyors, whereby there is a tally board for each distributing conveyor. Each tally board embodies a plurality of registers, actuated by keys, and also preferably embodies a total register which is actuated upon the actuation of the individual registers. Prior to the passage of the crate to the selected distributing conveyor, the proper individual register is actuated, to make a registration of the particular crate. Upon this actuation of the individual register, electrical means are actuated and the stop element of the selected distributing conveyor is moved to the inactive position, whereby the crate may pass downwardly upon such distributing conveyor. By this means, the passage of the several crates upon each distributing conveyor is positively controlled, and a proper registration made of the total number of crates fed upon each distributing conveyor and also of the numbers of the different crates.

Figure 1:
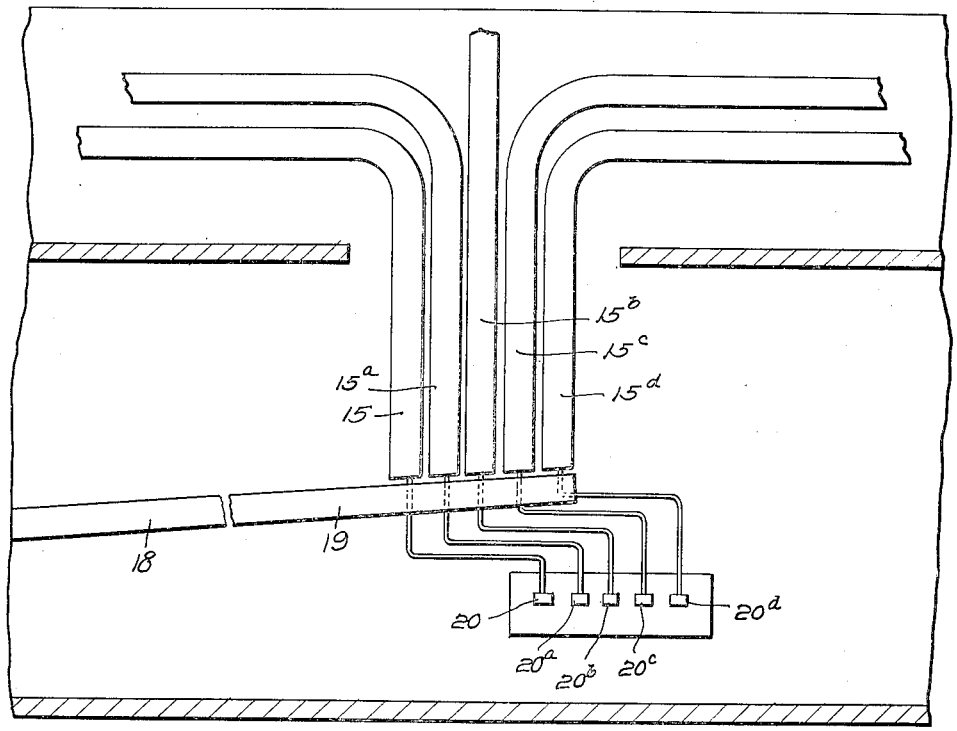
Figure 2:
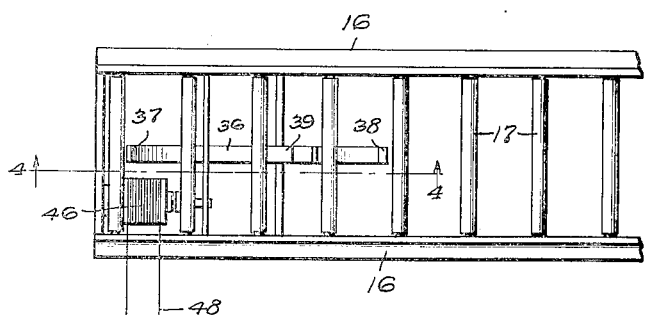
Figure 8:
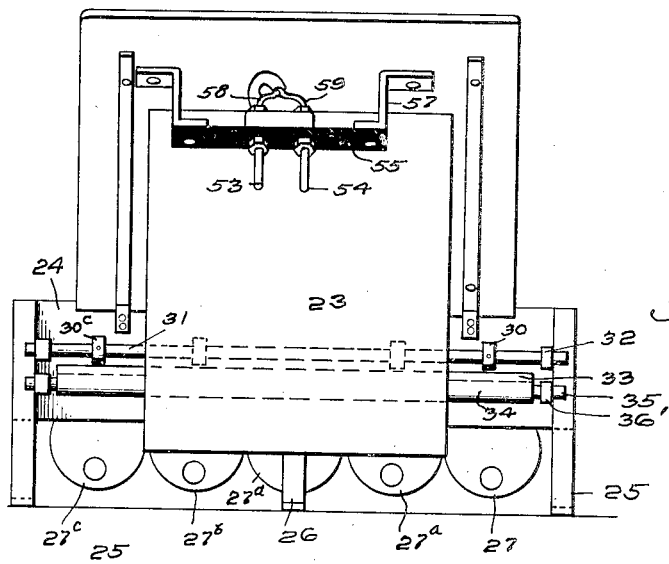
Figure 10:
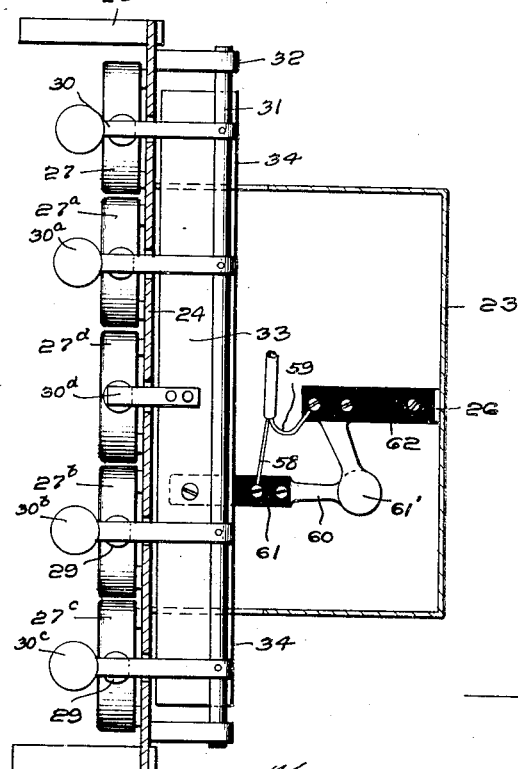
Figure 9:
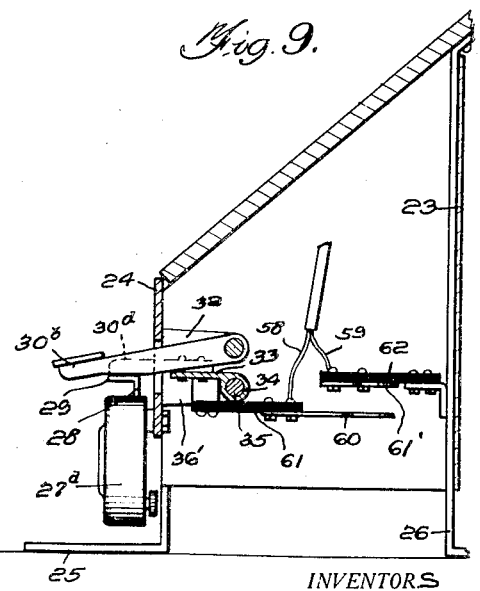

In the accompanying drawings, forming a part of this specification, and in which like numerals are employed to designate like parts throughout the same, Figure 1 is a plan view, partly diagrammatic, of apparatus embodying our invention, Figure 2 is a similar view of the tally board and one distributing conveyor, parts broken away, Figure 3 is a side elevation of the distributing conveyor, Figure 4 is a longitudinal section taken on line 4—4 of Figure 2, Figure 5 is a transverse section taken on line 5—5 of Figure 3, Figure 6 is a side elevation of the tally board and associated elements, Figure 7 is an end elevation of the same, Figure 8 is a rear side elevation of the tally board and associated elements, Figure 9 is a transverse section taken on line 9—9 of Figure 6, and, Figure 10 is a horizontal section taken on line 10—10 of Figure 6.

In the drawings, wherein for the purpose of illustration, is shown a preferred embodiment of our invention, the numerals 15, $15^a$, $15^b$, $15^c$ and $15^d$ designate a plurality of distributing conveyors, preferably longitudinally inclined toward their discharge ends and of the roller type. Each conveyor embodies side frames 16, between which are mounted rollers 17, as shown. The intake end portions of these distributing conveyors are parallel, as shown. The crates or other packages are advanced by an endless conveyor 18, and are delivered to the checking room and deposited upon a distributing table or shelf 19, which extends transversely of the intake end of the distributing conveyors 15, as shown.

Arranged in the checking room near the table 19 are tally boards 20, $20^a$, $20^b$, $20^c$ and $20^d$, which correspond in number and arrangement to the distributing conveyors, whereby a tally board is used in connection with each distributing conveyor. Each tally board 20 is provided at its top with an adjustable clamp 22, for holding papers or the like. Each tally board is mounted upon a housing 23, to the forward side of which is secured a plate 24 supported by legs 25. The housing is provided with a rear leg 26.

Mounted upon the plate 24, upon the rear side thereof, are registers 27, $27^a$, $27^b$, $27^c$ and $27^d$. These registers may be of any well known or preferred type and are adapted to register numbers from 1 to 999. Each counter is actuated by a reciprocatory arm 28, provided at its top with a head 29. Arranged above the heads 29 of the registers are keys or levers 30, 30ᵃ, 30ᵇ, 30ᶜ and 30ᵈ, to actuate the respective registers, as shown. These several levers are individualy pivoted upon a horizontal transverse shaft 31, arranged within the housing 23, and supported by brackets 32. The levers are independently pivotally mounted upon the shaft 31 and are adapted to swing independently of each other. The plungers 28 of the several registers are spring pressed to assume an uppermost position, and these several plungers return the levers to the uppermost position, when released. The levers 30, 30ᵃ, 30ᵇ and 30ᶜ are arranged above a plate 33, and this plate is provided at its forward edge with a knuckle 34, pivoted upon a stationary shaft 35, supported in brackets 36'. When each of the levers 30, 30ᵃ, 30ᵇ and 30ᶜ are depressed, the forward edge of the plate 33 is swung downwardly.

The plate 33 carries the lever 30ᵈ rigidly attached thereto. Hence when each of the registers 27, 27ᵃ, 27ᵇ, 27ᶜ are actuted, the total register 27ᵈ is actuated.

Each distributing conveyor is provided with a stop device, including a bar 36, having its rear end bent upwardly at a right angle to provide an approximately vertical stop 37. The forward end of the bar 36 is bent upwardly to provide an inclined resetting trip finger 38. The bar is pivotally supported at 39, from a bracket 40, and the arm of the bar which carries the stop element 37 is longer than the trip element 38, and when the bar is released, the trip element 37 will automatically gravitate to the lowered position, to assume an elevation slightly beneath the upper surface of the rollers of the distributing conveyor, as clearly shown in Figure 4. The bar or lever 36 has a locking pin 41 rigidly attached thereto, and this locking pin is adapted to engage above a notch 42, formed in a latch 43, pivoted at its upper end, as shown at 44. The pivoted latch 43 is provided at its lower end with an armature 45, arranged near an electromagnet 46 and adapted to be shifted toward the electro magnet when it is energized. The electro magnet is supported by a bracket 47. Each electromagnet 46 has one end thereof connected with a wire 48, connected with one side of a source of current 49, connected with a wire 50. The opposite end of the electromagnet 46 is connected with a wire 51. The wires 50 and 51 lead to a suitable plug 52, having contacts for connecting the wires 50 and 51 with binding posts 53 and 54. These binding posts are carried by an insulating strip 55, secured to brackets 57. The binding posts 53 and 54 have electrical connection with wires 58 and 59, as shown. The wire 58 is electrically connected with a contact 60, rigidly secured to the swinging plate 33, and insulated therefrom, as shown at 61. The wire 59 is electrically connected with a stationary contact 61', supported by stationary insulation 62.

It is thus seen that when a selected key at each tally board is depressed, the plate 33 will swing downwardly, causing the contact 60 to swing upwardly to engage contact 61'. A circuit will, therefore, be closed for energizing the electromagnet 46. In this closed circuit, current will flow from one pole of the source of current 49, through wire 50, binding post 53, wire 58, contact 60, contact 61, wire 59, binding post 54, wire 51, electromagnet 46, and through wire 48 back to the opposite pole of the source of current.

The operation of the apparatus is as follows:

The checking clerk may stand adjacent to the several tally boards. It might be stated that a tally board is provided in connection with each distributing conveyor, which may lead to a car or the like. It may be desired to load crates or the like of different vegetables or products into a selected car. For this reason each tally board is equipped with a plurality of registers. While five of these registers have been shown, it is obvious that any suitable number may be employed. For instance, if a car to which the distributing conveyer 15 leads is to be filled with crates containing different products, such as, celery, strawberries, grapefruit and oranges, then the register 27 may be employed to record the number of crates of celery, the register 27ᵃ to record the number of crates of strawberries, the register 27ᵇ to record the number of crates of grapefruit and the register 27ᶜ to record the number of crates of oranges. The total register 27ᵈ will record the total number of crates passed upon the distributing conveyor 15. When a crate of celery is advanced to the take up end of the conveyor 15, the operator will, therefore, depress the lever 30, actuating the counter 27, and at the same time closing the circuit to energize the electromagnet 46. When this is done, the stop element 37 gravitates to the lowered position, and the crate of celery travels downwardly and longitudinally of the distributing conveyor. As the crate passes over the raised resetting element 38, it depresses the same, elevating the stop element 37, whereby the pin 41 again engages over the shoulder 42, and the latch 45 will return to the vertical position, the electromagnet 46 being deenergized, as soon as the key 30 is released. It is, therefore, seen that as each crate is brought to the take up end of the distributing conveyor, the proper key at the tally board must be depressed before the trip element will be lowered to permit the crate to pass upon the distributing conveyor. When this is done, a registration of the crate is made by the counter. Of course, the operator may actuate other tally boards, which control other selected distributing conveyors.

It is to be understood that the form of our invention, herewith shown and described, is to be taken as a preferred example of the same, and that various changes in the shape, size and arrangement of parts may be resorted to without departing from the spirit of our invention, or the scope of the subjoined claims.

Having thus described our invention, we claim:—

1. In apparatus of the character described, a distributing conveyor, a supporting member arranged near the take up end of the distributing conveyor, a stop element arranged adjacent to the distributing conveyor and normally projecting into the path of travel of crates or the like to be fed upon the same from the supporting member, a register for use in connection with the distributing conveyor, a key actuating the register, an electrical device when energized to cause the stop element to be shifted to the inactive position, a circuit connected with the electrical device, and means whereby the circuit is closed when the key is depressed.

2. In apparatus of the character described, a distributing conveyor, a movable stop element arranged adjacent to the intake end of the distributing conveyor and normally projecting into the path of travel of the crates or the like to be fed upon the same, a register for use in connection with the distributing conveyor, a key to actuate the register, and an electrical device to cause the stop element to be shifted to the inactive position, a circuit connected with the electrical device, a resetting element connected with the stop element and adapted to be arranged in the path of travel of the crates or the like traveling upon the distributing conveyor, and means whereby the circuit is closed upon the action of the register.

3. In apparatus of the character described, a distributing conveyor, a movable stop element arranged adjacent to the take up end of the distributing conveyor and adapted to project above the same and also adapted to gravitate to an inactive position, said stop element having a resetting part adapted to project above the conveyor to be engaged by the crates or the like traveling upon the conveyor, a register for use in connection with the conveyor, a movable key to actuate the register, a latch device for releasably holding the stop element in the raised position, an electrical device to actuate the latch element, a circuit connected with the electrical device, and means to close the circuit upon the actuation of said key.

4. In apparatus of the character described, a distributing conveyor, a movable stop element arranged adjacent to the distributing conveyor and adapted to project above the same into the path of travel of crates or the like to be fed upon the conveyor, a register for use in connection with the conveyor, a pivoted key to actuate the register, a plate pivotally supported to turn upon its longitudinal axis and arranged beneath the key to be actuated thereby, an electrical device to cause the stop element to move to the inactive position, a circuit connected with the electrical device, and a switch to close the circuit including a movable contact carried by said plate.

In testimony whereof we affix our signatures.

THOMAS J. BELL.
JOHN W. BELL.